US011385404B2

(12) United States Patent
Manier et al.

(10) Patent No.: US 11,385,404 B2
(45) Date of Patent: Jul. 12, 2022

(54) MARKUP SYSTEM FOR OPTICAL SYSTEM, CARRIER SUBSTRATE, AND METHOD FOR MANUFACTURING OF SAME

(71) Applicant: Fraunhofer-Gesellschaft zur Förderung der angewandten Forschung e.V., Munich (DE)

(72) Inventors: Charles-Alix Manier, Berlin (DE); Hans-Hermann Oppermann, Berlin (DE); Kai Zoschke, Berlin (DE); Tolga Tekin, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/947,101

(22) Filed: Jul. 17, 2020

(65) Prior Publication Data
US 2021/0018679 A1   Jan. 21, 2021

(30) Foreign Application Priority Data
Jul. 19, 2019   (DE) .................... 10 2019 210 745.1
Jul. 24, 2019   (DE) .................... 10 2019 211 002.9

(51) Int. Cl.
*G02B 6/122*   (2006.01)
*G02B 6/12*   (2006.01)

(52) U.S. Cl.
CPC ....... *G02B 6/1225* (2013.01); *G02B 6/12007* (2013.01); *G02B 2006/12038* (2013.01)

(58) Field of Classification Search
CPC .......... G02B 6/1225; G02B 6/12007; G02B 6/4224; G02B 6/122; G02B 6/12004;
(Continued)

(56) References Cited

U.S. PATENT DOCUMENTS 6,553,171 B1   4/2003   Takahashi et al.
9,389,362 B1   7/2016   Brunschwiler et al.
(Continued)

FOREIGN PATENT DOCUMENTS

DE         10248969 A1    5/2004
DE      102016203453 A1    9/2017
(Continued)

OTHER PUBLICATIONS

"German Application Serial No. 10 2019 211 002.9, Office Action dated Feb. 5, 2020", w/Concise Statement of Relevance, (Feb. 5, 2020), 7 pgs.
(Continued)

*Primary Examiner* — Andrew Jordan
(74) *Attorney, Agent, or Firm* — Schwegman Lundberg & Woessner, P.A.

(57) ABSTRACT

Disclosed is a system for and a method of manufacturing of an optical system, including a first optical component, comprising a first waveguide and a carrier substrate, wherein the first optical component is arranged on the carrier substrate. The first optical component comprises a first markup set having a defined position/orientation with respect to the first waveguide, the carrier substrate has a second markup set detectable based on a relative position/orientation of the first and second markup sets when a desired orientation of the first waveguide relative to the carrier substrate is achieved in a reference plane extending parallel to a surface of the carrier substrate.

17 Claims, 12 Drawing Sheets

(58) Field of Classification Search
CPC ... G02B 6/13; G02B 6/136; G02B 2006/12038; G02B 2006/12176
See application file for complete search history.

(56) References Cited

U.S. PATENT DOCUMENTS

| | | | |
|---|---|---|---|
| 10,658,187 B2* | 5/2020 | Oppermann | H01L 27/14689 |
| 2011/0164846 A1 | 7/2011 | Zhang et al. | |
| 2019/0088490 A1* | 3/2019 | Oppermann | H01L 23/538 |
| 2021/0018679 A1* | 1/2021 | Manier | G02B 6/1225 |
| 2021/0018686 A1* | 1/2021 | Oppermann | G02B 6/4224 |
| 2021/0018687 A1* | 1/2021 | Oppermann | G02B 6/12004 |

FOREIGN PATENT DOCUMENTS

| | | |
|---|---|---|
| EP | 2287916 A2 | 2/2011 |
| EP | 3382433 A1 | 10/2018 |

OTHER PUBLICATIONS

"German Application Serial No. 10 2019 211 002.9, Office Action dated Aug. 3, 2021", w/Concise Statement of Relevance, (Aug. 3, 2021), 8 pgs.

\* cited by examiner

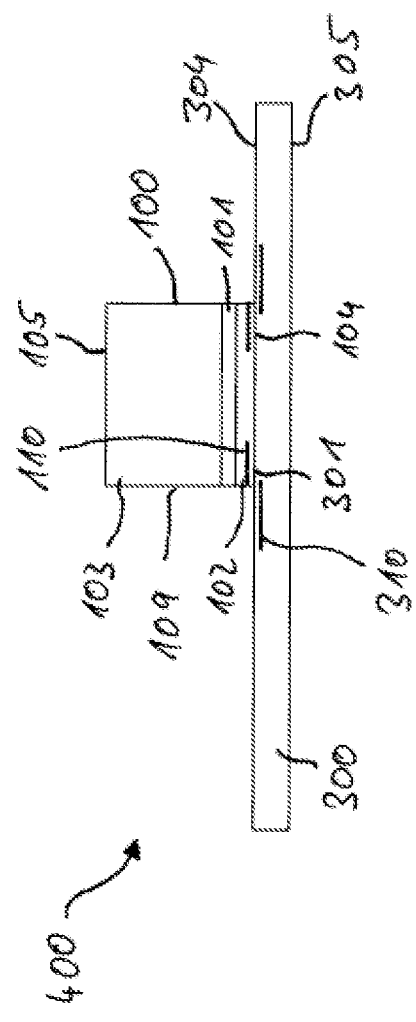
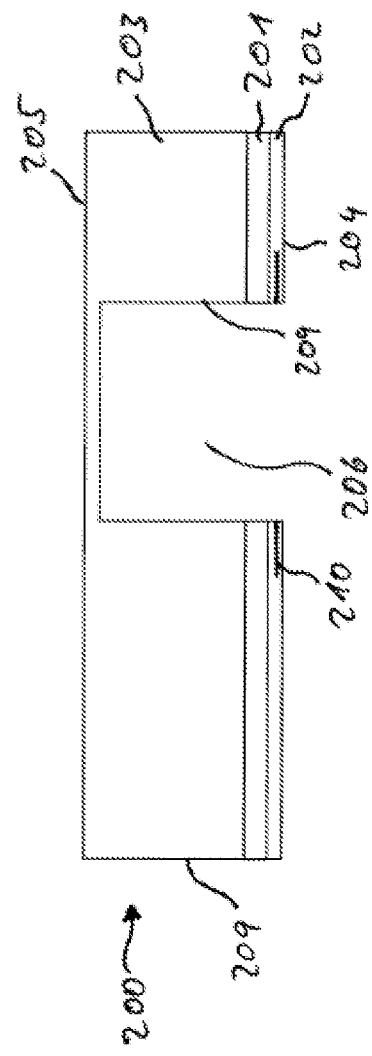

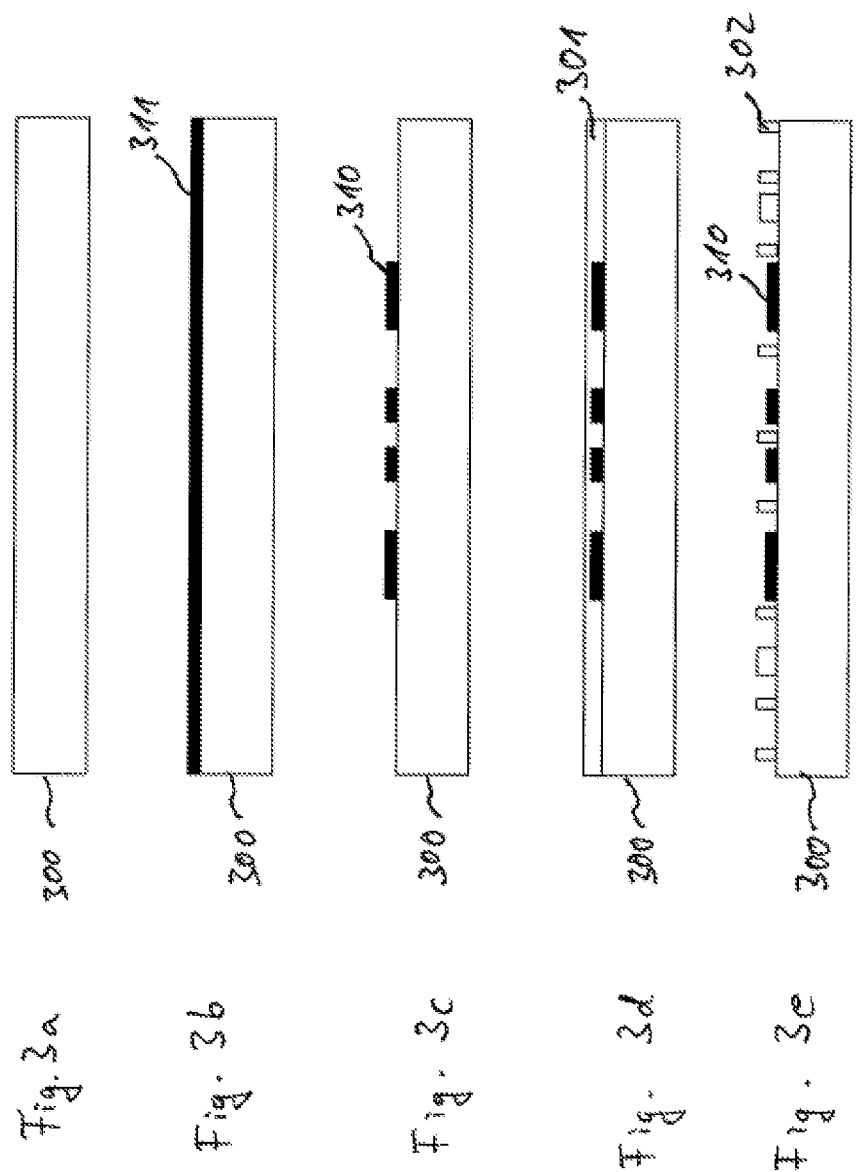

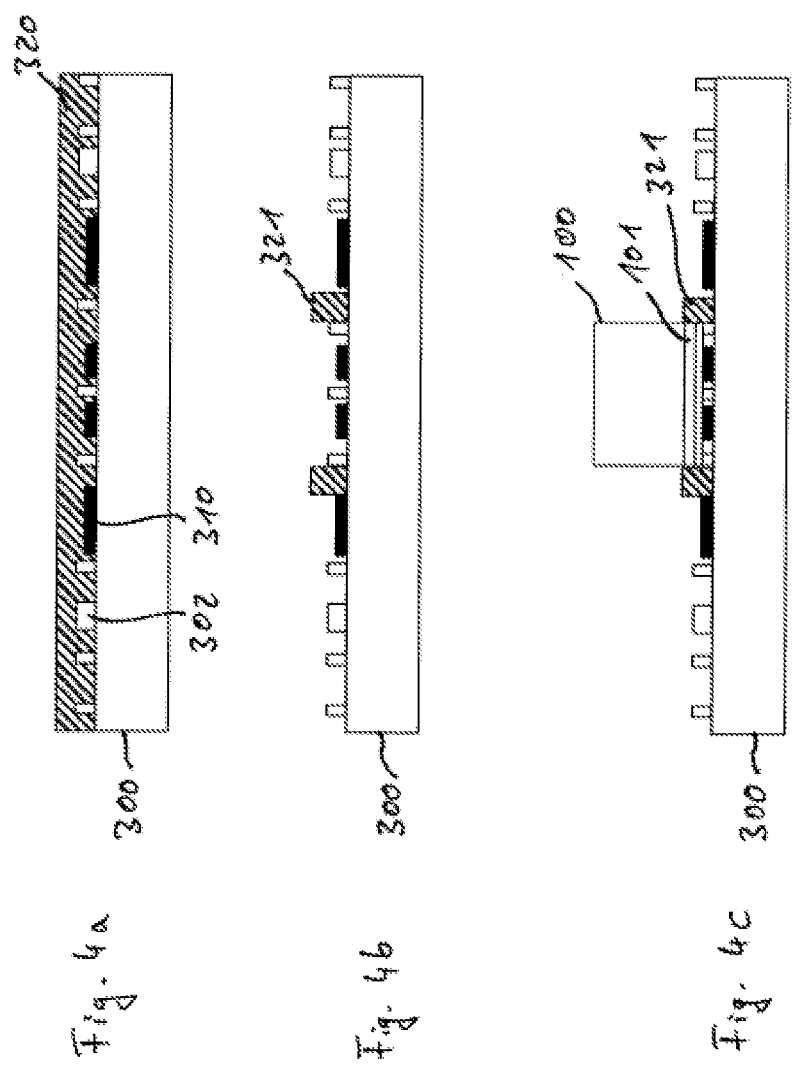

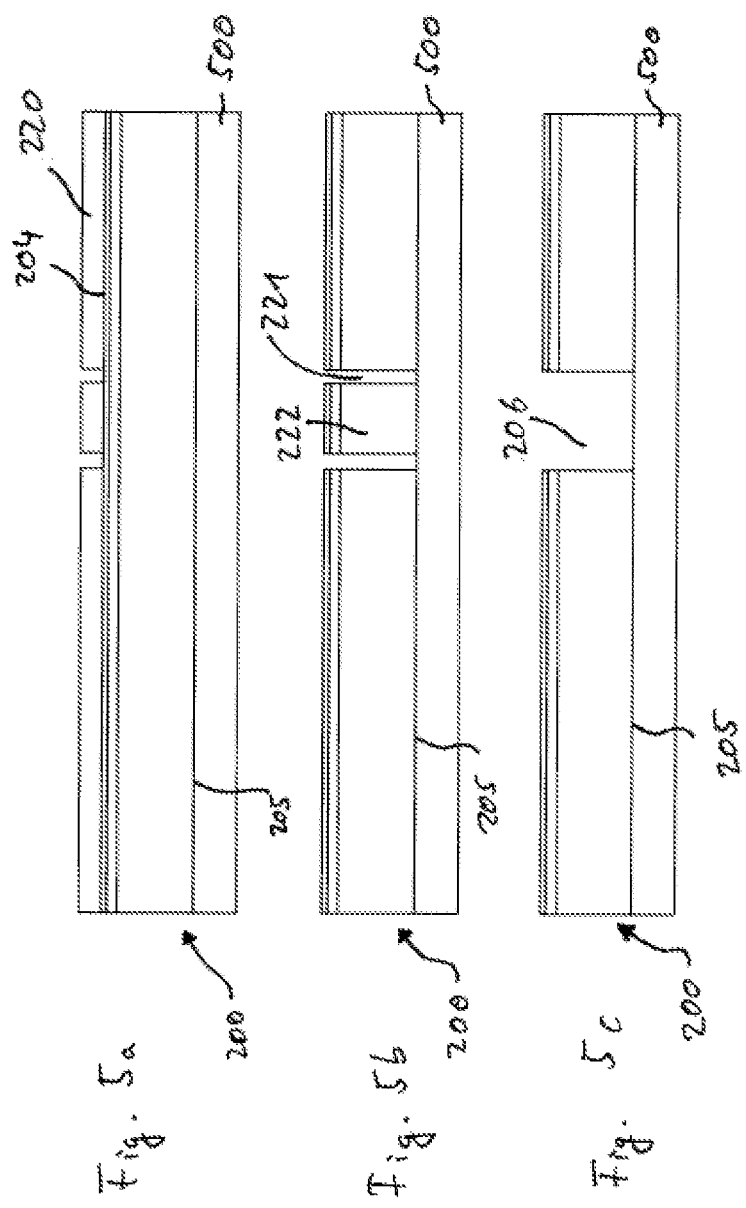

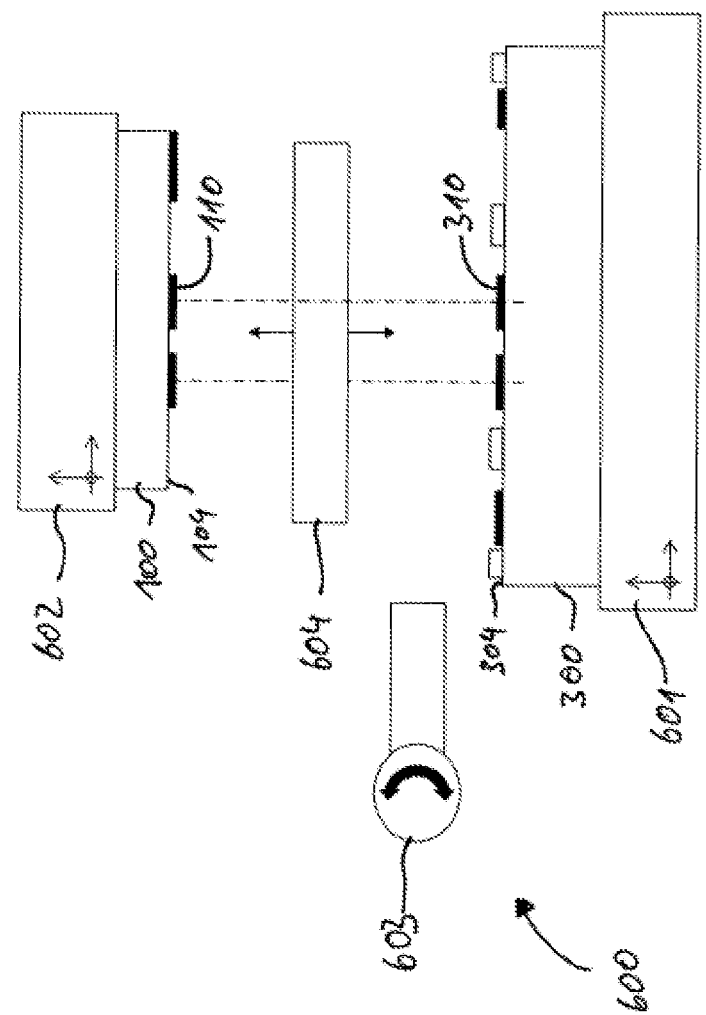

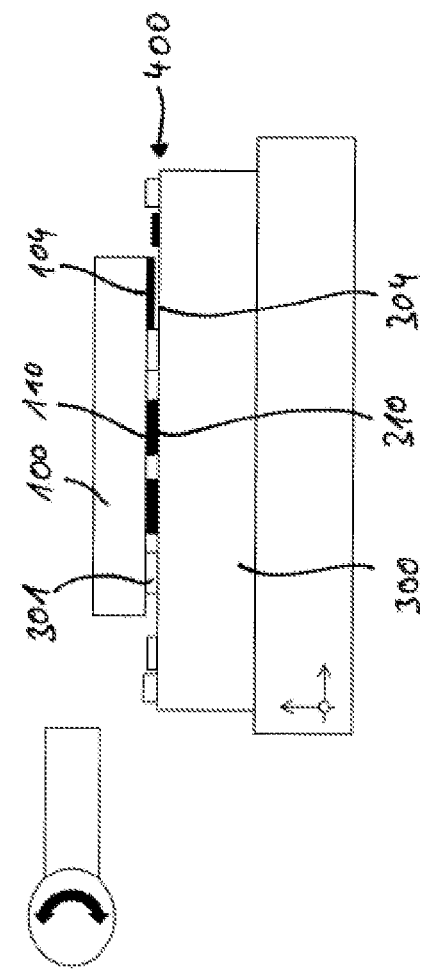

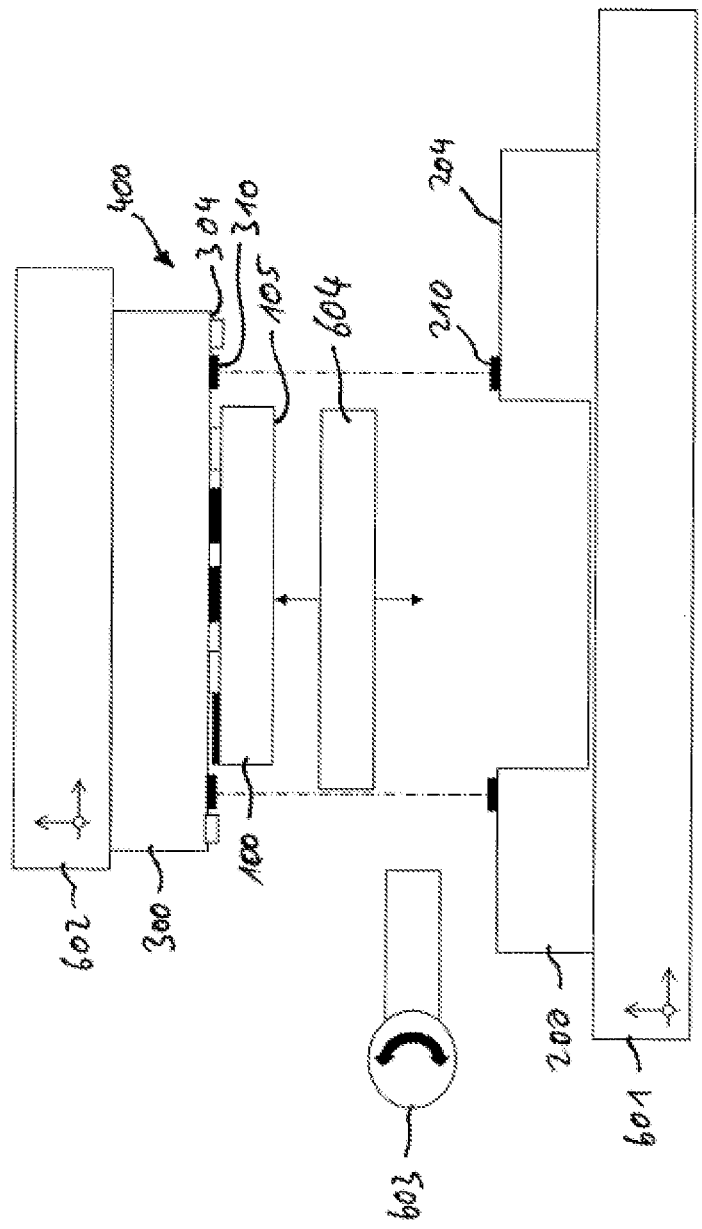

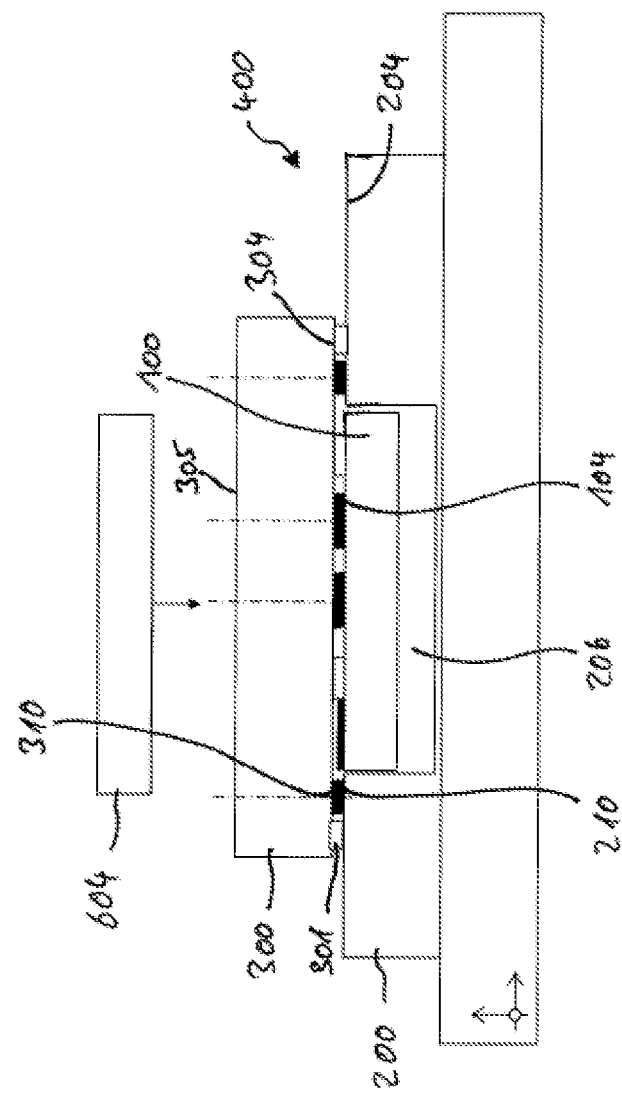

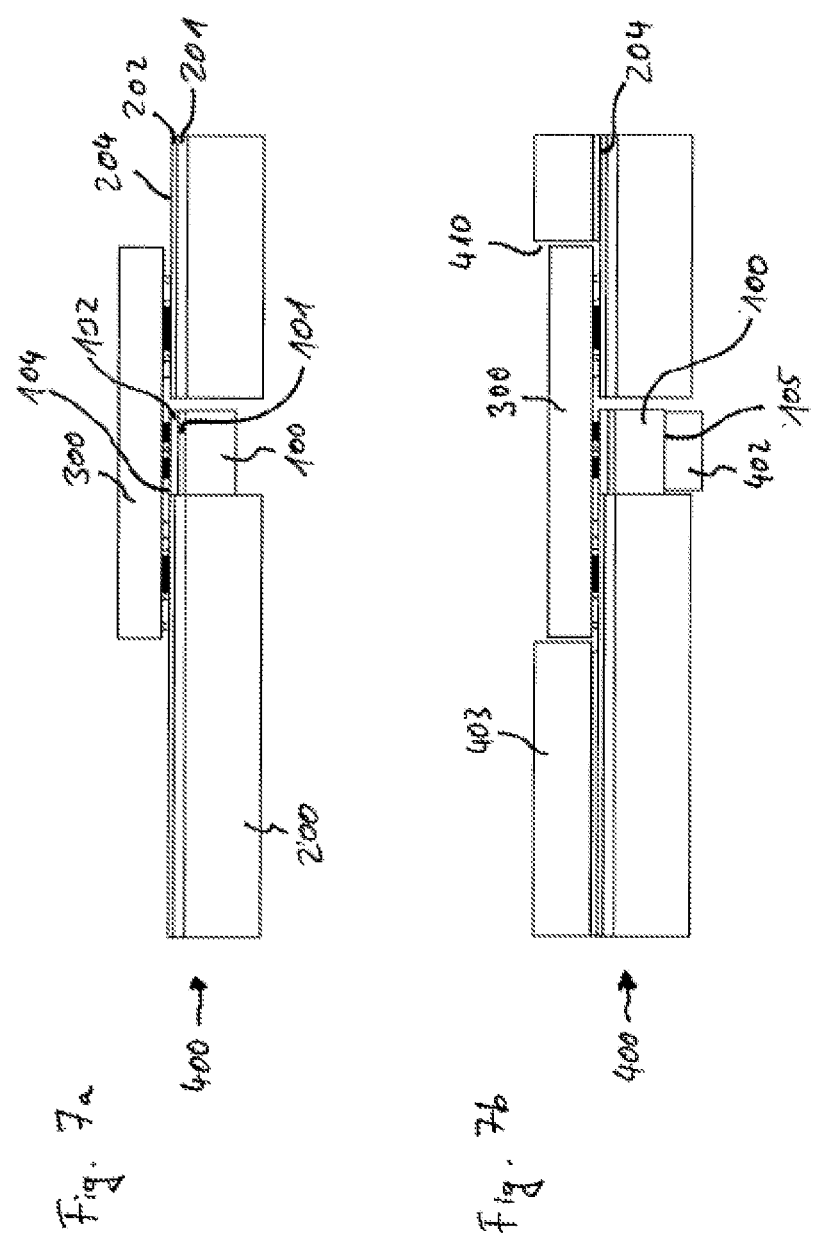

MARKUP SYSTEM FOR OPTICAL SYSTEM, CARRIER SUBSTRATE, AND METHOD FOR MANUFACTURING OF SAME

CLAIM FOR PRIORITY

This application claims the benefit of priority of German Application Serial No. 10 2019 211 002.9, filed Jul. 24, 2019 and German Application Serial No. 10 2019 210 745.1, filed Jul. 19, 2019, each of which are hereby incorporated by reference in their entireties.

TECHNICAL FIELD

The disclosure relates to an optical system, a carrier substrate, and a method for manufacturing an optical system.

BACKGROUND

Optical elements—such as lasers, modulators, photodiodes, and other elements—are increasingly miniaturized. Compact optical systems can thus be implemented on suitable substrates, for example as a photonic integrated circuit (PIC). Such systems can be used to implement splitters, couplers, phase shifters, ring resonators, arrayed waveguide gratings, optical amplifiers, switches, and other functional units. Light is transmitted by waveguides, which can be embedded into optical components made of flat substrates or deposited thereon.

It can be advantageous when producing respective optical systems to provide an optical component with a recess or cavity into which then another optical component is inserted. A respective optical system and a respective manufacturing method are known from patent document DE 10 2016 203 453 A1.

SUMMARY/OVERVIEW

When manufacturing optical systems of this type, there always is the problem of optically coupling waveguides of various components to be solved, that is, to align these so precisely to each other that light from one waveguide can be transmitted into another waveguide with sufficient efficiency for any intended applications.

Edge-emitting optical components are frequently used when manufacturing such systems, i.e. such components in which light propagating in the waveguide can exit from an end face of the component or light can be coupled into a waveguide through an end face. The respective end faces are arranged and aligned relative to each other in a suitable position and orientation for optical coupling of such components, which is also called butt coupling.

The precision requirements such alignment must meet are the higher the smaller the dimensions of the waveguides to be coupled. For example, a single-mode waveguide, which allows propagation of just one light mode, can have a cross section from a few hundred nanometers to a few micrometers, which predetermines respective narrow tolerances for optical coupling.

Various methods have been proposed for precise alignment of edge-emitting optical components in a butt coupling configuration.

In so-called active methods, a light signal which can be transmitted and measured when optical coupling is achieved can be maximized by positioning the components. But such methods are complex, accordingly costly, and can only be used in specific situations. They are also an obstacle to further miniaturization.

Passive methods do without measuring a light signal transmitted by the coupling and the required complex manufacturing assemblies. But these methods typically require compliance with extremely stringent manufacturing tolerances of the optical components (for example when aligning these relative to each other using reference contact surfaces), which again is complex and costly.

Furthermore, heterogeneous integration methods have been proposed for manufacturing PICs, wherein semiconductor materials are bonded on complementary metal oxide semiconductor wafers and the semiconductors are then finish-processed, which allows good precision due to the lithographic structuring of components. Such methods are practicable in few applications only due to process-related restrictions and low yield.

Accordingly, it is the problem of the disclosure to propose an optical system with improvements regarding the alignment of components, which improvements prevent or reduce the disadvantages mentioned. Furthermore, the problem is to propose a carrier substrate and a method for manufacturing an optical system.

This problem is solved, according to the disclosure, by an optical system according to claim 1, by a carrier substrate according to claim 11, and by a method according to claim 12. Advantageous embodiments and further developments of the disclosure result from the features of the dependent claims.

The proposed optical system includes a first optical component, comprising a first waveguide and a carrier substrate, wherein the first optical component is arranged on the carrier substrate.

The first optical component comprises a first markup set having a defined position and/or orientation with respect to the first waveguide, the carrier substrate comprises a second markup set, and it can be detected based on a relative position and/or orientation of the first and second markup sets if a desired orientation of the first waveguide relative to the carrier substrate is achieved in a reference plane extending parallel to a surface of the carrier substrate.

The first optical component and the carrier substrate each have a front side and a rear side located opposite the front side. Other side surfaces, which are oriented perpendicular to the front or rear side, respectively, are called end faces herein. Directions that are parallel to the front side—that is, also to the reference plane—are called lateral directions, directions perpendicular thereto are called normal directions.

Such an optical system has the advantage that, by detecting the orientation of the first optical component and the carrier substrate based on the relative position and/or orientation of the first and second markup sets—preferably while manufacturing the optical system—allows alignment of the first optical component and the carrier substrate to each other at high precision in a comparatively simple and cost-effective manner (namely by correcting a relative position and/or orientation of the first and second optical components and the carrier substrate). The system can also be prepared for arranging a second optical component with a second waveguide on the carrier substrate, wherein the first and second waveguides can be optically coupled. Particularly, the known advantages of passive alignment while easing manufacturing tolerances are achieved.

Using a carrier substrate with a markup set also has the advantage that it can be designed and manufactured separately from the optical components and thus provides considerable flexibility.

A markup set as defined in the present application includes one or more markings, a marking being an element the position and/or orientation of which can be detected by means of a suitable measuring device. This detection can particularly be performed optically, for example by means of a camera or another optical scanning or detection system (such as a laser scanning system with a raster scanner and a point, line, or area detector) as a measuring device. Detection can alternatively be performed in a different way, for example using electrical or magnetic or contact-based measuring. When detecting the position and/or orientation of a markup set, all markings, multiple markings, or just one marking can be detected completely or partially. Detection can include processing of data measured using the measuring device by means of a processing unit.

A markup set can thus be usable as positioning aid when aligning two components. Accordingly, a markup set or marking of a markup set can be an element which does not fulfill an optical, electronic, mechanical and/or other function other than being used as positioning aid. Alternatively, a markup set can fulfill other functions.

A marking can for example be a coating, an embedded part, or a part of a component, sections of which were modified with respect to specific properties, such as optical properties, relative to the environment. Alternatively, a marking can be a part usable and/or intended for other purposes, such as a structural part of a component, e.g. an edge, corner, surface, or a waveguide.

The optical system can include a second optical component arranged on the carrier substrate, comprising a second waveguide which can be optically coupled to the first waveguide.

The optical system can thus advantageously be extended, for example, by the optical, electronic, and/or electro-optical functionality of the second optical component.

The second optical component can include a third markup set with a defined position and/or orientation with respect to the second waveguide. It can be detected based on a relative position and/or orientation of at least two of the markup sets if the first and second optical components are oriented in a reference plane extending parallel to a surface of the carrier substrate in such a manner that optical coupling of the first and second waveguides is made possible.

Since the optical coupling is made possible, as described, by respective aligning of the optical components in lateral directions, optical coupling is initially prepared. Establishing optical coupling includes allowing optical coupling by aligning in lateral directions and in a normal direction.

The markup sets of the respective optical system can be configured such that they allow aligning the optical components to each other, which again includes aligning the waveguides to each other for establishing or improving or preparing optical coupling of the waveguides. Aligning the optical components to each other can include aligning of markup sets to each other by adjusting a relative position and/or orientation of the optical components and/or the carrier substrate in such a manner that a specified relative position and/or orientation of the markup sets is achieved. The specified relative position and/or orientation of the markup sets results from the defined position and/or orientation of the markup sets of the optical components with respect to the respective waveguide in such a manner that, by establishing the specified relative position and/or orientation, optical coupling of the waveguides is achieved, improved, or prepared. For aspects of aligning the optical components, all markings, multiple markings, or just one marking of the markup set may have to be completely or partially taken into account within a given markup set.

This means that passive coupling with the advantages mentioned is available for the waveguides of the two optical components.

The optical components and/or the carrier substrate can be flat or two-dimensionally extended elements, which may for example be implemented as chips or wafers or formed therefrom. At least one of the optical components and/or the carrier substrate may comprise a semiconductor chip (such as a silicon chip), a photonic integrated circuit (PIC), a silicon-on-insulator chip, a ceramic chip, and/or a glass chip and/or a polymer. Furthermore, the carrier substrate may contain materials such as silicon or other semiconductor materials, ceramics, glass, or polymers, or may consist thereof. At least one of the waveguides may contain a polymer, a glass, an oxide (such as $SiO_2$), a nitride (such as $Si_3N_4$ in $SiO_2$), and/or silicon (e.g. as Si or $SiO_2$). The manifold embodiments and uses of such components, materials, and compositions as well as the methods for their manufacture and processing are thus transferred to the proposed method, including the advantages known to a person skilled in the art.

The optical components can be edge-emitting; the first and second waveguides can thus be arranged inside the respective optical component such that light can propagate in the waveguides parallel to the front end of the respective optical component—and/or emerge there—and can enter or exit the waveguide through a portion of an end face.

The end faces can be prepared by dry etching (using a lithographic varnish for targeted defined edge creation of the end faces) or mechanical polishing, or by breaking (optionally after previous heating) along defined crystal surfaces. This makes it possible to achieve advantageous properties for coupling light into and out of the waveguides through the end faces.

At least one of the optical components may have another or multiple other waveguides in addition to the first/second waveguide. The carrier substrate may also comprise at least one waveguide. If the carrier substrate has a waveguide, the method may comprise establishing an optical coupling between the waveguide of the carrier substrate and the first and/or second waveguide.

In addition to the waveguides, at least one of the optical components and/or the carrier substrate may include other elements, such as optical and/or electronic elements. For example, at least one of the optical components and/or the carrier substrate can be configured as an electro-optical circuit.

The second optical component may further comprise a recess through which the second optical component at least partially passes from a front side in the direction of a rear side located opposite the front side, wherein the first optical component is arranged in the recess.

Arranging an optical component in a recess of another optical component results in advantages with respect to thermal properties of the optical system, high-frequency applications, as well as scaling and manufacturing costs. This is also pointed out in patent document DE 10 2016 203 453 A1 mentioned above.

The recess may be produced in one piece, either mechanically or by means of a laser process, etched out, or by etching surrounding indentations (trenches) and subsequent removal of the remaining core. The recess may either completely or partially pass through the second optical component, wherein the latter case provides particularly good optical and mechanical accessibility of the interior of the recess.

The first and/or second optical component may of course have one or more other recesses. Accordingly, the system may include at least a third optical component, which again comprises at least one third waveguide which is optically coupled to the first and/or second waveguides and/or at least one fourth markup set having a defined position and/or orientation relative to the third waveguide and being arranged on the carrier substrate in the one other recess/one of the other recesses The fourth and first and/or second markup sets can then be suitable for detecting a relative position and/or orientation of the first and second waveguides to each other in the reference plane.

The second markup set can comprise: a first portion, adapted to bring the first waveguide into a defined position and orientation relative to the carrier substrate, and thus as well to the first waveguide, by aligning the first markup set and the first portion of the second markup set to each other, and a second portion, adapted to bring the second waveguide into a defined position and orientation relative to the carrier substrate by aligning the first markup set and the first portion of the second markup set to each other The carrier substrate can be at least partially transparent and/or translucent for a specific wavelength range, particularly for visible light, ultraviolet light, and/or infrared light. Detecting the relative position and/or orientation of the second and first and/or third markup sets can advantageously performed using a camera unit which is placed near the rear side of the carrier substrate facing away from the optical components and can capture images of the optical components and their markup sets or portions of markup sets, respectively, through the carrier substrate. The camera unit can be configured for simultaneous capturing of images in multiple directions; for example, the camera unit can be provided with a beam splitter, whereby images can be taken and/or overlapped in two opposite directions at the same time. The camera unit configured in this manner can be inserted between the first component and the carrier substrate or between the second component and the carrier substrate (including any elements arranged thereon, such as the first optical components). The carrier substrate and the first/second optical components can then be simultaneously detected and aligned using the respective markup sets.

By detecting the relative position and/or orientation of two waveguides, positioning can be achieved at a maximum deviation from a desired relative position in lateral directions of, for example, less than 5 µm, less than 2 µm, less than 1 µm, less than 500 nm, or less than 200 nm, and/or a maximum angular deviation from a desired orientation in lateral directions of, for example, less than 10 mrad, less than 5 mrad, less than 2 mrad, or less than 1 mrad.

The first waveguide may have a first distance from the front side of the first optical component, the front side of the first optical component may be facing the carrier substrate, and the first distance may be selected such that a desired relative position and/or orientation of the first waveguide and the carrier substrate to each other is set in the normal direction.

This ensures a precise and repeatable orientation of the first waveguide relative to the carrier substrate in the normal direction.

In this situation, the second waveguide may have a second distance from the front side of the second optical component, the front side of the second optical component may be facing the carrier substrate, and the first and second distances may be selected such that a relative position and/or orientation of the first and second optical components to each other and in a normal direction perpendicular to a surface of the carrier substrate in such a manner that optical coupling of the first and second waveguides is made possible.

This results in an orientation of the first and second waveguides in the normal direction that contributes to optical coupling. This means that the advantages of passively aligning the waveguides can also be leveraged for orientation in the normal direction.

For example, a maximum deviation from a desired relative position in the normal direction can be achieved that is less than 2 µm, less than 1 µm, less than 500 nm, less than 200 nm, or less than 100 nm.

The first and/or second distances can be set by layers arranged on the front side of the first and/or second optical components. This ensures highly precise and repeatable alignment of the first and second waveguides to each other in the normal direction. Such layers can be deposited onto the front side of the first and/or second optical components using various methods, for example by epitaxy (also followed by metalizations or passivations, such as by means of oxide or nitride), plasma enhanced chemical vapor deposition (PECVD), or other layer deposition processes.

A desired efficiency of optical coupling can be achieved by combining suitable lateral and normal deviation tolerances, such that attenuation of the intensity of a light signal coupled into one of the other waveguides compared to the intensity of a light signal coupled out of another waveguide is for example less than 3 dB, less than 2 dB, or less than 1 dB.

A distance between a first end face of the first optical component where an end of the first waveguide to be coupled to the second waveguide terminates, and a second end face of the second optical component where an end of the second waveguide to be optically coupled to the first waveguide terminates, may for example be less than 2 µm, less than 1 µm, less than 500 nm, less than 200 nm, less than 100 nm, but also more than 2 µm The first and second end faces may also contact each other.

At least a portion of one of the markup sets can be used as a reference surface when setting the first and second distances.

For example, such a part of a marker set can be implemented as a metal layer of defined thickness on the front side of the corresponding optical component and/or of the carrier substrate, which defines a stop and thus a reference surface during arrangement of the optical components on the carrier substrate. Thus, a robust alignment can be implemented in the normal direction.

It may be provided that at least one part of at least one of the markers sets is implemented by means of a part of one of the waveguides or contains said and/or is produced, directly or indirectly, in the same layer orientation and/or by means of the same mask. This enables an especially uncomplicated manufacture of the optical components and/or of the optical system without additional steps in order to produce the markers.

At least one part of at least one of the marker sets can be applied to one of the optical components or the carrier substrate or may be embedded therein by means of a lithographic process. In this manner, precise production and especially good visibility of the marker sets and/or parts thereof can be achieved.

It may be provided that at least one part of at least one of the marker sets and at least one part of at least one of the waveguides are produced in a common work step and/or by means of a common mask through a lithographic process. This has the advantage that the position and/or the orientation of the marker sets and/or the corresponding parts thereof is defined as relates to the corresponding waveguide with great precision and reproducibility.

At least one of the markers sets may have at least one linear and/or cruciform and/or cruciform and/or elliptical and/or polygonal element and/or several parallel lines and/or a vernier structure.

Linear elements and/or combinations thereof (which thus comprises cruciform and polygonal elements—and/or edges thereof—or vernier structures) are advantageous. Sets of several parallel linear elements can be considered especially advantageous. Linear elements of a marker set may extend parallel to the corresponding waveguides at a fixed distance/fixed distances away and thus enable an especially good alignment of the waveguides with respect to one another.

The aforementioned advantages take effect in the frequently encountered situation in which a waveguide in the vicinity of the end surface of an optical component—and particularly at the entry and/or exit point of the waveguide on the end surface—is not parallel to the end surface but instead meets it at an angle of more or less than 90°. Thus, undesired back-reflections of light, for example in laser cavities, can be avoided. In this situation, the precise position of the entry and/or exit point depends on how much material has been removed during polishing or refraction of the end surface (see above). If a linear element of a marker set extends parallel to the waveguide, the linear element will be shortened the same as the waveguide, and the point of intersection between the linear element and the end surface will change in the same manner as the entry and/or exit point of the waveguide.

In addition, a necessary offset of the optical components, which can be defined, for example, by the refractive indices of the associated waveguides and the distance between the corresponding end surfaces, can be set by means of the positions and/or orientations of the linear elements.

It may be provided that end surfaces, facing one another, of the first end of the second element have a distance, for example, of less than 100 µm, less than 10 µm, less than 1 µm, or less than 100 nm at the end of the method—i.e. particularly after the alignment of the components with respect to one another and the arrangement of both components on the carrier substrate.

It may be provided that the first and the second marker set and/or the second and third marker set supplement one another and/or engage one another and/or are complementary to one another in order to facilitate an alignment. This may occur, for example, in the case of simple linear elements or, for example, in the case of vernier structures, which are known to enable an especially precise determination of the position deviation. For example, parts of the first and/or second and/or marker set may each result in the read-off and main scale of a vernier structure.

It may be provided that at least one of the marker sets comprises several markers at a distance which is as large as possible (i.e. as large as possible according to the scale of the dimension of the corresponding optical component and/or of the carrier substrate and the arrangement of other elements thereupon). A greater distance between elements enables more precise determination of deviations in the position and/or orientation of optical components and/or of the carrier substrate from the desired position.

It may be provided that at least a part of at least one of the marker sets extends from an end surface of the corresponding optical component and/or of the carrier substrate to another edge and/or that at least one of the marker sets comprises elements in the vicinity of several end surfaces. On the one hand, the accuracy of the determination of position/orientation deviations is also hereby improved; on the other hand, the course of a waveguide in the vicinity of several end surfaces can be considered, particularly when optical couplings are to be achieved on several end surfaces.

It should also be generally considered that each marker set must contain at least one discernible point, which is different from the other points, for each independent degree of freedom (displacement, angle tilt) to be considered during alignment of the optical elements with respect to one another. With linear or otherwise extended, i.e. not pointy, elements, this can be provided by several defined points of such elements (for example end points).

At least one part of at least one of the marker sets may be an edge of one of the optical components or of the carrier substrate or may contain them/it.

Thus, a clear position can be defined with reference to an exit point of said waveguide, namely as the point of intersection between the edge and the linear element, particularly in conjunction with a further part of the same marker set—implemented as a linear element positioned parallel to one of the waveguides.

A corresponding edge of at least one of the optical elements can be marked and thus rendered especially easily visible also by a part of a marker set, which is designed as an extended surface element (i.e., for example, as a polygon, for example as a rectangle).

It may be provided that the carrier substrate and/or at least one of the optical components has an adhesive layer, configured for the temporary and/or permanent attachment of the first and/or second optical component to the carrier substrate. Thus, a robust and flexible attachment option is provided. The adhesive used may consider the requirements of the process for producing or of the proper use of the optical system in many different ways, for example with respect to temperature resistance, thermal conductivity, other thermal or electrical properties, conformity to effective mechanical forces, etc. The adhesive layer can also enable an at least temporary sealing of spaces between the optical components and/or the carrier substrate.

It may be provided that the adhesive layer is structured and/or noncontinuous and/or that the alignment of the first and the second waveguide with respect to one another in the normal direction comprises at least partial deformation of the adhesive layer.

A structured and/or noncontinuous adhesive layer comprises several discrete adhesive elements, which can be achieved, for example, by means of lithographic processing of a continuous adhesive layer. Such an adhesive layer especially provides a great amount of flexibility and can be adapted to the method and/or usage requirements in an advantageous manner with respect to the structure size/density/surface configuration of the adhesive.

To this end, the adhesive elements may be shaped in different ways, for example as points, rectangles, polygons, rings, or linear elements. The adhesive elements may be superposed over further elements of the surface of the optical components and/or of the carrier substrate—for example of a structured metal layer serving as a part of a marker set—or arranged in the intermediate spaces thereof.

An alignment of the first and second waveguide with respect to one another in the normal direction with at least partial deformation of the adhesive layer can be implemented, for example, such that structured metal layers on the front sides of the optical components and of the carrier substrate serve as reference surfaces for alignment in the normal direction, and the adhesive elements of the structured adhesive layer are arranged in the intermediate spaces of the structured metal layer. If the adhesive elements are thicker than the structured metal layer, they are deformed when the optical component(s) are pressed together with the carrier substrate, whereby a stable adhesion is achieved and combined with the advantages of the structured metal layer with respect to the alignment in the normal direction.

The structuring of the adhesive layer in discrete, size-defined adhesive elements of selectable shape enables an adaptation and/or optimization of parameters of the manufacturing process, particularly with respect to the bonding surface/layout of the optical component(s) and/or the required bonding force (press-on force during attachment) and/or the required degree of deformation of the adhesive layer for the alignment of the optical component(s). A maximized degree of deformation (i.e. "flattening") of the thin adhesive layer can therefore also be achieved more reliably, which enables a more robust processing window and/or an increased reproducibility of the manufacturing process.

The proposed carrier substrate has a marker set and is configured to be applied with an optical component, having a waveguide and a marker set with a defined position and/orientation with respect to the waveguide such that, by means of a relative position and/or orientation of at least two of the marker sets, it can be determined whether a desired alignment of the waveguide has been established with respect to the carrier substrate in the reference plane.

The thusly obtained carrier substrate is advantageously to be used during production of the proposed optical system.

The proposed method for producing an optical system comprises:
providing at least one optical component, each having a waveguide, and a carrier substrate;
arranging the at least one optical component on the carrier substrate.
It is provided that the at least one optical component has a marker set with a defined position and/or orientation with respect to the respective waveguide, the carrier substrate has a second marker set, and the arrangement of the at least one optical component on the carrier substrate comprises the following:
detecting a relative position and/or orientation of the marker set of the at least one optical component with respect to the second marker set of the carrier substrate in order to align the at least one optical component with respect to the carrier substrate in a reference plane parallel to a surface of the carrier substrate.

The method has the advantage that the detection of the relative position and/or orientation of the first optical component and of the carrier substrate with respect one another—preferably during the production of the optical system—enables an alignment of the first optical component and of the carrier substrate with respect one another with great accuracy in a manner that is comparatively simple to implement and is economical (namely by means of possible correcting of a relative position and/or orientation of the first and optical component and of the carrier substrate).

Thus, the system can also be prepared for the arranging of a second optical component with a second waveguide on the carrier substrate, wherein the first and the second waveguides can then be optically coupled together. In particular, the known advantages of passive alignment are achieved with simultaneous easing of the production tolerances.

During arranging of the first and second optical component on the carrier substrate, initially the first optical component, for example, can be arranged on the carrier substrate such that its front side is facing the front side of the carrier substrate. In this case, the first optical component can be aligned with respect to the carrier substrate with the assistance of a suitable measuring device, which enables the determining of a relative position and/or orientation at least of parts of the first and second marker set. At the same time or subsequently, the first optical component can be temporarily or permanently attached to the carrier substrate, for example by means of an adhesive applied to the carrier substrate and/or to the first optical component.

The second optical component can thus be guided to the back side of the first optical component such that the front side of the first optical component is likewise facing the front side of the carrier substrate, but that there is still a distance between first and second component, which enables a determining of a relative position and/or orientation at least of parts of the second and third marker set by means of the measuring device. This can occur, for example, in optical ways, for example by recording images using at least one camera. A position and/or orientation of the second optical component and/or of the first optical component, including the carrier substrate, can thus be corrected according to the determined relative position and/or orientation such that thereby an alignment of the first and second waveguide with respect to one another is enabled, particularly in the lateral directions.

After the correcting is complete, the determining of the relative position and/or orientation of the optical components can be repeated—optionally multiple times, i.e. iteratively—until a desired tolerance of the relative position and/or orientation of the first and second waveguide is achieved or values are within the tolerance, in order to check and/or correct the position and/or orientation of the first and/or second component. The second optical component can be arranged on the carrier substrate while retaining the alignment and likewise be temporarily or permanently attached, for example by means of an adhesive applied to the carrier substrate and/or to the second optical component. In this case, the first optical component can be arranged in the recess of the second optical component.

Alternatively, initially the second optical component can be arranged on the carrier substrate, and moreover can be moved similarly as above, during arrangement of the first and second optical component on the carrier substrate—provided the recess passes completely through the second optical component—wherein, however, the steps which relate to the first or second optical component, respectively, are correspondingly reversed or modified.

The described checking and/or correcting of the relative position and/or orientation of the first and second waveguide can also be used to reject workpieces in which a desired tolerance was not achieved or can also be used to improve the method iteratively, for example by adapting correction factors.

It may be provided that the first waveguide has a distance from the front side of the first optical component, that the second waveguide has a second distance from a front side of the second optical component, that the first and second optical components are facing the carrier substrate during arrangement of the first and second optical component on the carrier substrate, and that the alignment of the first and second optical component with respect to one another comprises the following:

setting of the first and second distance in order to align the first and second waveguide with respect to one another in a normal direction perpendicular to the reference plane.

The setting of the first and second distance may further comprise an application of layers to the front side of the first and/or second optical component, wherein, for example, the previously mentioned layer deposition processes can be used, e.g. epitaxy or PECVD.

The method may comprise a removal of the carrier substrate from the at least one optical component after alignment of the at least one optical component with respect to the carrier substrate.

Thus, the flexibility is increased for further processing steps.

The optical system can optionally be further developed in different ways which are customary for the processing of corresponding systems. This may comprise, for example, a filling of the remaining gaps between the optical components with suitable filling materials and/or thinning of surfaces and/or applying electrical contacting.

The method can be implemented with the assistance of typical systems and devices for producing electronic, optical, or electro-optical components and systems, for example by means of a flip chip bonder.

It should be mentioned that the aforementioned steps and sub-steps of the method do not have to be executed in a particular sequence, rather the sequence can be established depending on specific modalities.

BRIEF DESCRIPTION OF THE FIGURES

Exemplary embodiments of the disclosure are explained in the following by means of FIG. 1 to FIG. 7b. The following is shown schematically in each case:

FIG. 1a a cross-section of an optical system with a first optical component and a carrier substrate;

FIG. 1b a cross-section of a second optical component;

FIG. 3a to FIG. 3e cross-sections of the carrier substrate shown in FIG. 1b during various steps of a method for producing the optical system shown in FIG. 2;

FIG. 4a to FIG. 4c cross-sections of a carrier substrate according to a further example in method steps according to another example;

FIG. 5a to FIG. 5e cross-sections of the carrier substrate shown in FIG. 1b during various steps of a method for producing the optical system shown in FIG. 2 in various examples;

FIG. 6a to FIG. 6d cross-sections of the optical components and the carrier substrate according to FIG. 1a and FIG. 1b as well as components of a processing device during various steps of a method for producing the optical system shown in FIG. 2, wherein the optical system shown in FIG. 1a represents an intermediate step;

FIG. 7a the optical system according to FIG. 2 during a method step;

FIG. 7b to FIG. 7e the optical system according to FIG. 2 during various steps of a method for the production thereof according to further examples.

DETAILED DESCRIPTION

Figure 2:
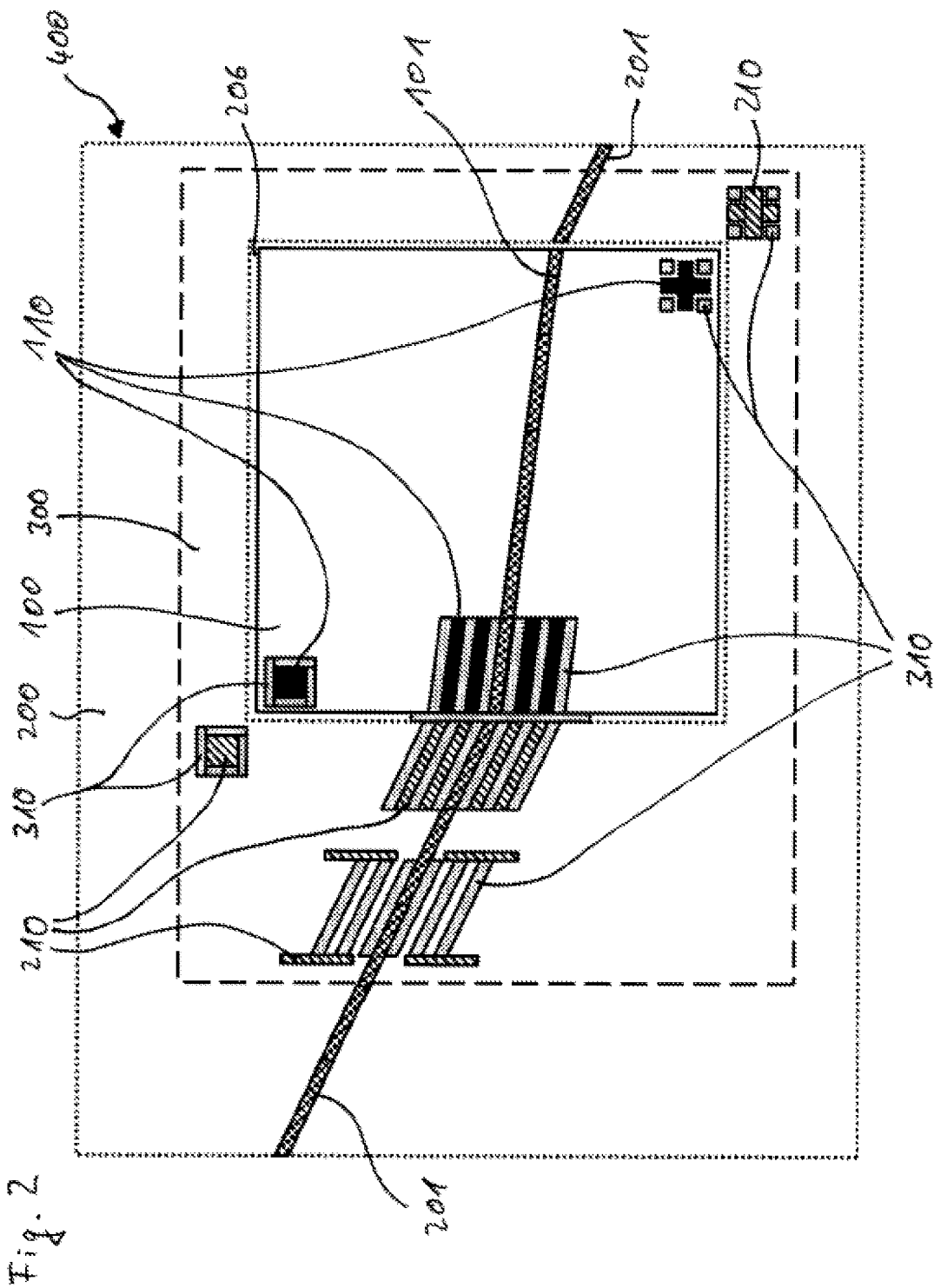
FIG. 2 a top view of a further example of an optical system.

Repeating and similar features of various examples and embodiments are indicated in the following with the same reference numerals.

The optical system 400 shown in cross-section in FIG. 1a has a first optical component 100 and a carrier substrate 300.

The first optical component 100 has a first waveguide 101, which is formed between a first substrate layer 102 and a second substrate layer 103, wherein the substrate layers, 102 and 103, are implemented in a III/V material system and/or semiconductor material system. The first substrate layer 102 is arranged on a front side 104 of the first optical component 100, and the second substrate layer 103 is arranged on a back side 105 of the first optical component 100, said back side being opposite the front side 104. The first waveguide 101 exits into end surfaces 109 of the first optical component 100, which is perpendicular to the front side 104.

The first optical component 100 is attached to a glass wafer which serves as the carrier substrate 300 and which is transparent for ultraviolet, visible, and infrared wavelengths (for example, a wavelength range of from 200 nm to 1200 nm or also only for subranges, for example of 400 to 800 nm) by means of an adhesive layer 301. The carrier substrate 300 has a front side 304 facing the first optical component 100 and a back side 305 opposite the front side 304.

The first optical component 100 has a first marker set 110 with a defined position and orientation with respect to the first waveguide 101, and the carrier substrate 300 has a second marker set 310. As explained further below, it can be determined whether a desired alignment of the first waveguide 101 with respect to the carrier substrate 300 is produced in a reference plane parallel to a surface of the carrier substrate 300 by means of a relative position and/or orientation of the first and second marker set, 110 and 310.

The second optical component 200 shown in cross-section in FIG. 1b is implemented as a photonic integrated circuit (PIC). The second optical component 200 has a second waveguide 201, which is formed as a nitride waveguide (based on SiNx) in an SiO2 layer in the example shown. The SiO2 layer 202 containing the second waveguide is arranged on a silicon layer 203. The second waveguide 201 may also be formed in a different manner, for example by means of lithographic structuring of a further silicon layer arranged on the SiO2 layer 202 (silicon-on-insulator architecture, SOI). The second waveguide 201 may optionally be supported in addition by thin oxide passivation.

The SiO2 layer 202 is arranged on a front side 204 of the second optical component 200, and the silicon layer 203 is arranged on a back side 205 of the second optical component 200, said back side being opposite the front side 204. The second waveguide 201 exits into end surfaces 209 of the second optical component 200, which is perpendicular to the front side 204.

Those end surfaces 209, at which the second waveguide 201 is intended to be optically coupled to the first waveguide 101, are prepared through mechanical polishing or through lithographically defined dry etching or through targeted local dry etching. Alternatively, the end surfaces 209 can be prepared, for example, through refraction along defined crystal surfaces.

Layers 101 and 202 on the front side are prepared through depositing processes such that precisely defined layer thicknesses result.

The second optical component 200 has a recess 206, which partially extends through the second optical component 200 from the front side 204 in the direction of the back side 205. Alternatively, it can also pass completely through the second optical component 200. The recess 206 can also be omitted. In this case, the optical components, 100 and 200, are arranged next to one another instead of within one another.

The second optical component 200 has a third marker set 210 with a defined position and/or orientation with respect to the second waveguide 210.

The optical components, 100 and 200, as well as the carrier substrate 300 may also be formed in different ways and/or from different materials as previously described by example. For example, at least one of optical components 100 and 200 may have a semiconductor chip (e.g. a silicon chip), a photonic integrated circuit (PIC), a silicon-on-insulator chip, a ceramic chip, and/or a glass chip. Furthermore, the carrier substrate 300 may contain materials such as silicon or other semiconductor materials, ceramics, glass, or polymer or consist thereof. At least one of the waveguides, 101 and 201, may contain a polymer, a glass, an oxide (e.g. $SiO_2$), a nitride (e.g. $Si_3N_4$ in $SiO_2$), and/or silicon (e.g. as Si on $SiO_2$).

The further exemplary embodiment of an optical system 400 shown in a top view in FIG. 2 comprises the second optical component 200 (indicated by the dotted outlines) with the recess 206, the first optical component 100 (indicated by a solid outline), and the carrier substrate 300 (indicated by the dashed outline).

The first optical component 100 has a first marker set 110 with a defined position and orientation with respect to the first waveguide 101. The carrier substrate 300 has a second marker set 310. The second optical component 200 has a third marker set 210 with a defined position and orientation with respect to the second waveguide 201. By means of a relative position and orientation of pairs (110/310, 210/310, 110/210) of the marker sets, it can be determined whether the first and second optical component, 100 and 200, are aligned with respect to one another in the reference plane such that an optical coupling is enabled between the first and second waveguide, 101 and 201.

To this end, the third marker set 210 has a first part, which is formed from linear elements extending parallel to the second waveguide 201 and at fixed distances, and a second part, which is formed from linear, square, and cruciform elements, which are complementary to a first part of the second marker set 310. Complementary in this case means that elements of the corresponding parts of both marker sets, 210 and 310, supplement one another and/or have boundary lines parallel to one another due to super-position into contiguous shapes, when a desired relative alignment is present.

In a corresponding manner, the first marker set 110 also has a first part, which is formed from linear elements extending parallel to the first waveguide 101 and at fixed distances, and a second part, which is formed from linear, square, and cruciform elements, which are complementary to a second part of the second marker set 310.

The marker sets 110, 210, 310 may also, of course, be structured differently, for example at least one of them may have at least one round and/or elliptical and/or polygonal, e.g. rectangular, element and/or a vernier structure. The edges, which are formed by the optical components, 100 and 200, at the end surfaces, 109 and 209, in the region of the markers sets, 110 and 210, can be considered part of the markers sets, because they have defined points of intersection with the linear elements of the vernier structures.

The marker sets, 110, 210, and 310, are implemented as structured metal layers, which are applied to the front sides, 104, 204, and 304. The markers sets 110, 210, 310 may also be implemented in a different manner; for example, markers sets 110 and 210 can be produced with the respective waveguides, 101 and 201, each in a common work step, and by means of a common mask, due to a lithographic process, i.e. can be embedded in the optical components, 100 and 200, in the same plane as the waveguides, 101 and 201. Furthermore, the waveguides, 101 and 201, themselves can serve as marker sets or parts of markers sets, provided they are readily visible.

The adhesive layer 301 is implemented as a structured adhesive layer. Alternatively, it can be implemented also as a continuous layer.

Exemplary steps of the method for producing the optical system 400 are described in the following by means of FIG. 3a to FIG. 7f. The method comprises providing the first optical component 100, the second optical component 200, and the carrier substrate 300.

FIG. 3a to FIG. 3e show the carrier substrate 300 in various steps of its preparation, which may be part of the method for producing the optical system 400. The glass wafer, which serves as the carrier substrate 300 (FIG. 3a) is initially provided with a continuous metal layer 311 (FIG. 3b), which is subsequently structured by means of a lithographic process, whereby the second marker set 310 (FIG. 3c) is formed.

Subsequently, an adhesive layer 301 is applied (FIG. 3d), which can be structured by means of a lithographic process and/or dry etching process and/or ablation process, whereby discrete adhesive structures 302 result (FIG. 3e). The adhesive structures 302 are preferably arranged in regions of the carrier substrate 300 outside of the second marker set 310.

FIG. 4a to FIG. 4c show a further example of a carrier substrate 300 in various steps of its preparation. The glass wafer, which serves as the carrier substrate 300 and can be provided with the second marker set 310 and the structured adhesive layer 302, is provided with a continuous optically transparent polymer layer 320 (FIG. 4a). The polymer layer 320 is subsequently structured by means of a lithographic process, whereby a set of carrier substrate waveguides 321 (FIG. 4b, bottom) is formed. FIG. 4c shows the thusly prepared carrier substrate 300 in an exemplary method step, in which the first optical component 100 is arranged on the carrier substrate 300 such that an optical coupling is established between the first waveguide 101 and the carrier substrate waveguides 321.

FIG. 5a to FIG. 3c show the second optical component 200 in various steps of its preparation, which may be part of the method for producing the optical system 400. In this case, the second optical component 200 is arranged with its back side 205 on a carrier 500. After application of a mask 220 to the front side 204, trenches 221 are etched into the second optical component 200, wherein a core 222 remains. The mask may preferably be removable and/or be a lithographically structured layer (metal layer, passivation layer, polymer (photo)resist). After removal of the core 222 and optionally of the carrier 500 as well as of the mask 220, the second optical component 200 has a shape similar to that shown in FIG. 1b (but with a continuous recess 206), which is prepared for the further method steps.

Figure 5D:
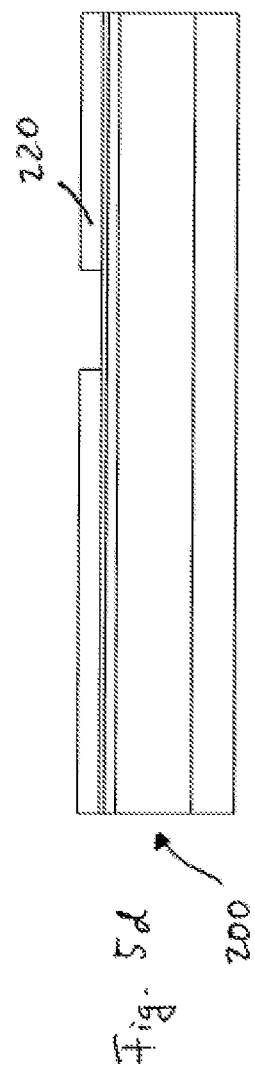
Figure 5E:
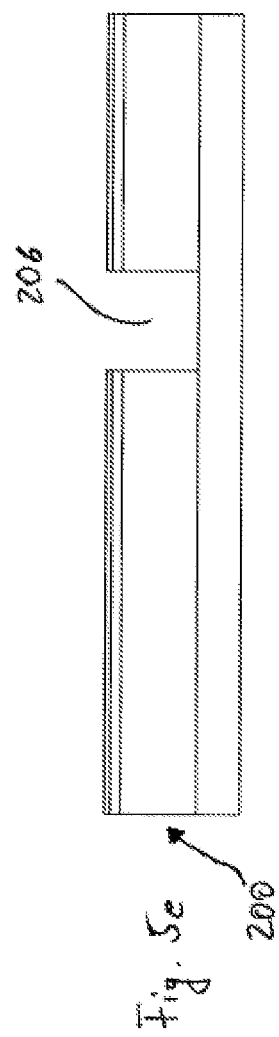

FIG. 5d and FIG. 5e show the second optical component 200 in preparation steps according to a further example. The procedure is substantially as previously described in this case, but the mask 220 is designed such that the recess 206 is etched directly—i.e. without the intermediate step of providing trenches.

FIG. 6a to FIG. 6d show exemplary steps of the arranging of the first and second optical component, 100 and 200, on the carrier substrate 300 such that the first optical component 100 is arranged in the recess 206 of the second optical component 200, as well as of the aligning of the first and second optical component, 100 and 200, with respect to one another, wherein a flip chip bonder 600 is used as the processing device.

The flip chip bonder 600 comprises: a lower component carrier or chuck 601, an upper component carrier or bonding arm 602, a turning carrier or flip arm 603, and a camera system 604.

The chuck 601 is configured for retaining and/or three-dimensionally moving a structural element on a side facing the bonding arm 602. The bonding arm 602 is configured for retaining and/or three-dimensionally moving a structural element on a side facing the chuck 601. The flip arm 603 is configured to accommodate a structural element and/or to turn it 180° and/or to transfer it to the chuck 601 or to the bonding arm 602. The camera system 604 may be arranged between the chuck 601 and the bonding arm 602 and is configured to simultaneously depict a part of a structural element retained by the chuck 601 and a part of a structural element retained by the bonding arm 602 (depiction directions are indicated by arrows), which can also be achieved, for example, by means of two lenses in conjunction with two sensors or one sensor and one optical splitter.

In the method step shown in FIG. 6a, the chuck 601 retains the carrier substrate 300, and the bonding arm 602 retains the first optical component 100 such that the front sides, 104 and 304, are facing each other.

At the same time, a part of the first marker set 110 and a part of the second marker set 310 are depicted by means of the camera unit 604, which enables a detecting of a relative position and orientation of the first optical component 100 and of the carrier substrate 300, or more precisely of a deviation from a desired relative position and orientation. Due to the movement of the chuck 601 and/or the bonding arm 602, the first optical component 100 and the carrier substrate 300 are then aligned with respect to one another (indicated by dashed lines).

As shown in FIG. 6b, the front sides, 204 and 304, are subsequently brought together (after removal of the camera unit 604) through movement of the chuck 601 and/or of the bonding arm 602, while retaining the desired relative position and orientation, until the first optical component 100 is arranged on the carrier substrate 300 and attached by means of the adhesive layer 301. In this case, the adhesive layer 301 is partially deformed through pressing to the extent that the marker sets, 110 and 310, and/or the front sides, 104 and 304, act as reference surfaces.

At this point, the mounting of the first optical component 100 on the carrier substrate 300 can be further evaluated in a control step. By means of the optically transparent carrier substrate 300, the relative positions and/or orientations of the first optical component 100, the second optical component 200, and the carrier substrate 300 can be detected, after removal of the bonding arm 602, through the detecting of parts of the marker sets 110, 210, 310 by means of the camera unit 604.

The carrier substrate 300 with the first optical component 100 thereupon is turned by means of the flip arm 603 and transferred to the bonding arm 602. The second optical component 200 is then placed on the chuck 601, wherein the front side 204 of said component is facing the front side 304 of the carrier substrate 300 and the back side 105 of the first optical component 100 arranged thereupon.

The thusly produced situation is shown in FIG. 6c. At the same time, a part of the third marker set 210 and a part of the second marker set 310 are then depicted by means of the camera unit 604, which enables a detecting of a relative position and orientation of the second optical component 200 and of the carrier substrate 300, or more precisely of a deviation from a desired relative position and orientation. Due to the movement of the chuck 601 and/or the bonding arm 602, the second optical component 200 and the carrier substrate 300 are then aligned with respect to one another (indicated by dashed lines). Because the first optical component 100 is already aligned with respect to the carrier substrate 300 due to the preceding steps, an alignment of the first and second optical component, 100 and 200, with respect to one another is also achieved.

As shown in FIG. 6d, the front sides, 204 and 304, are subsequently brought together (after removal of the camera unit 604) through movement of the chuck 601 and/or of the bonding arm 602, while retaining the desired relative position and orientation, until the second optical component 200 is arranged on the carrier substrate 300 and attached by means of the adhesive layer 301, as well as the first optical component 100 is arranged in the recess 206 of the second optical component 200. In this case, the adhesive layer 301, in turn, is partially deformed through pressing to the extent that the marker sets, 210 and 310, and/or the front sides, 204 and 304, act as reference surfaces.

By means of the optically transparent carrier substrate 300, the relative positions and orientations of the first optical component 100, the second optical component 200, and the carrier substrate 300 can be detected, after removal of the bonding arm 602, through the detecting of parts of the marker sets 110, 210, 310 by means of the camera unit 604. The result of the alignment can hereby be checked; if the accuracy of the alignment is outside of a specified tolerance, the preceding method steps may optionally be repeated, or the workpiece can be rejected.

It should be mentioned that individual or all method steps can also, of course, be executed in a different manner or in a different sequence. For example, initially the second optical component 200 can be arranged and aligned on the carrier substrate 300, and subsequently the first optical component 100 can be placed in the recess 206 of the second optical component 200, provided the recess 206 passes completely through the second optical component 200.

FIG. 7a shows the optical system 400 as it is after the preceding steps with the first optical component 100, the second optical component 200, and the carrier substrate 300 (without the processing device 600 at this point). Due to the precise, defined layer thicknesses of the front-side layers, 102 and 202, a first distance is set between the front side 104 of the first optical component 100 and the first waveguide 101, and a second distance is set between the second optical component 204 and the second waveguide 201 to the extent that the desired relative position and orientation of the first and second optical component, 100 and 200, is thereby set in the normal direction and thus also the waveguides, 101 and 201, are aligned with respect to one another in the normal direction to the extent that the optical coupling thereof is enabled.

Because the waveguides, 101 and 201, are thus precisely aligned both laterally and also normally with respect to one another, an optical coupling of the waveguides, 101 and 201, is established.

FIG. 7b to FIG. 7e show the system 400 after various optional further method steps, with which the optical system 400 can be further processed.

As shown in FIG. 7b, a sacrificial structure 402 can be attached to the back side 105 of the first optical component 100 in this case. A sub-carrier 403 with a recess 410 for accommodating the carrier substrate 300 can be attached to the front side 204 of the second optical component.

Figure 7C:
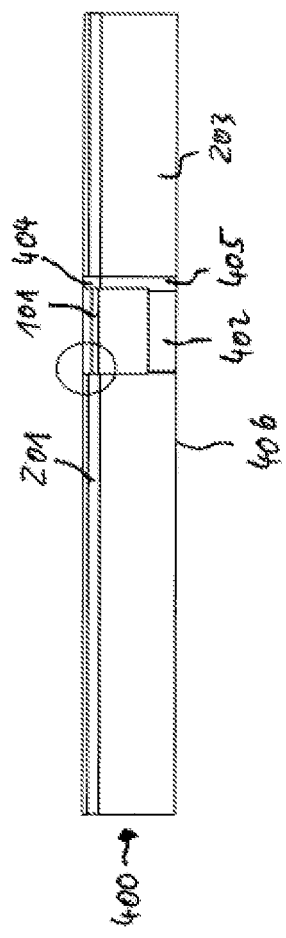
Figure 7D:
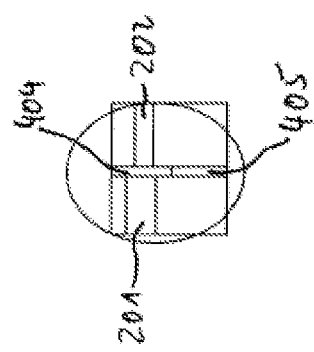

In addition, as shown in FIGS. 7c and 7d, wherein FIG. 7d is a detailed view of the region marked by an ellipse in FIG. 7c, any remaining gaps between the waveguides, 101 and 201, can be filled with an optical filling material 404. The optical filling material 404 in this case has properties beneficial for the optical coupling (wavelength transmission, refractive index, dispersion function, etc.).

Subsequently, gaps remaining between the optical components, 100 and 200, can be filled with a potting compound 405. The carrier substrate 300 and/or the sub-carrier 403 can be removed, for example, by means of laser debonding or grinding. The (cured) potting compound 405, the silicon layer 203, and the sacrificial structure 402 can be thinned by grinding down to a common back side 406.

Figure 7E:
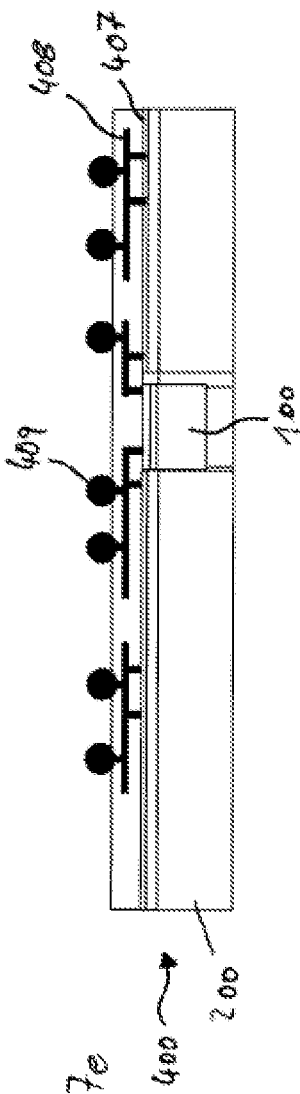

As shown in FIG. 7e, the optical components, 100 and 200, can be electrically contacted with thin-film multilayer wiring 408 and provided with bumps (contact elements) 409 on an exposed common front side 407.

Of course, the number, type, and sequence of the steps of the method can be adapted, as is directly clear to one skilled in the art (particularly with respect to the optical system to be produced and/or the properties of the optical components used).

LIST OF REFERENCE NUMERALS

- 100 First optical component
- 101 First waveguide
- 102 First substrate layer
- 103 Second substrate layer
- 104 Front side
- 105 Rear side
- 109 End face
- 110 First markup set
- 200 Second optical component
- 201 Second waveguide
- 202 SiO2 layer
- 203 Silicon layer
- 204 Front side
- 205 Rear side
- 206 Recess
- 209 End face
- 210 Second markup set
- 220 Mask
- 221 Trenches
- 222 Core
- 300 Carrier substrate
- 301 Adhesive layer
- 302 Adhesive structures
- 304 Front side
- 305 Rear side
- 310 Second markup set
- 311 Metal layer
- 320 Polymer layer
- 321 Carrier substrate waveguide
- 400 Optical system
- 402 Sacrificial structure
- 403 Auxiliary carrier
- 404 Optical filler material
- 405 Casting compound
- 406 Rear side
- 407 Front side
- 408 Thin film multilayer wiring
- 409 Bumps
- 410 Recess
- 500 Carrier
- 600 Flip chip bonder
- 601 Chuck
- 602 Bond arm
- 603 Flip arm
- 604 Camera system

What is claimed is:

1. An optical system, including:
    a first optical component, comprising a first waveguide; and
    a carrier substrate, wherein the first optical component is arranged on the carrier substrate;
    wherein the first optical component comprises a first markup set having a at least one of defined position or orientation with respect to the first waveguide, the carrier substrate has a second markup set detectable based on at least one of a relative position or orientation of the first markup set and the second markup set when a desired orientation of the first waveguide relative to the carrier substrate is achieved in a reference plane extending parallel to a surface of the carrier substrate.

2. The optical system according to claim 1, further including a second optical component which is arranged on the carrier substrate and comprises a second waveguide which can be optically coupled to the first waveguide.

3. The optical system according to claim 2, wherein the second optical component comprises a third markup set having at least one of a defined position or orientation with respect to the second waveguide detectable based on at least one of a relative position or orientation of at least two of the markup sets if the first optical component and the second optical component are oriented relative to each other in a reference plane extending parallel to a surface of the carrier substrate in such the first waveguide and the second waveguide are optically coupled.

4. The optical system according to claim 3, wherein the first waveguide has a first distance from the front side of the first optical component, the second waveguide has a second distance from a front side of the second optical component, where the front side of the first optical component and the front side of the second optical component are facing the carrier substrate, and the first distance and the second distance are selected such that at least one of a relative position or orientation of the first and second optical components to each other in a normal direction oriented perpendicular to a surface of the carrier substrate is set in such that the first and second waveguides are optically coupled.

5. The optical system according to claim 2, wherein the second optical component further comprises:
    a recess through which the second optical component at least partially passes from a front side in the direction of a rear side located opposite the front side, wherein the first optical component is arranged in the recess.

6. The optical system according to claim 2, wherein the carrier substrate of the first optical component and the second optical component is removable and wherein a gap between the first waveguide and the second waveguide is filled with an optical filler material, and wherein a gap between the first optical component and the second optical component is filled with a casting compound.

7. The optical system according to claim 2, wherein a sacrificial structure is attached on a rear side of the first optical component facing away from the carrier substrate, wherein an auxiliary carrier with a recess for receiving the carrier substrate is attached on a front side of the second optical component facing the carrier substrate, and wherein surfaces of the first and second optical components are back thinned on a shared rear side.

8. The optical system according to claim 1, wherein the carrier substrate is at least partially transparent or translucent in a specific wavelength range, wherein the wavelength range is at least one of a range of visible, ultraviolet, or infrared wavelengths.

9. The optical system according to claim 1, wherein at least a portion of at least one of the markup sets is realized by a portion of at least one of the waveguides or contains the same, wherein at least a portion of at least one of the markup sets is an edge of at least one of the optical components, the carrier substrate, or contains the same, wherein at least a portion of at least one of the markup sets is deposited by a lithographic method onto at least one of the optical components, the carrier substrate, or is embedded in the same, and wherein at least a portion of at least one of the markup sets and at least a portion of at least one of the waveguides are produced by at least one of a lithographic method in a joint operation or using a shared mask.

10. The optical system according to claim 1, wherein at least one of the markup sets comprises at least one of a linear, a cross-shaped, a circular, an elliptical, or a polygonal element, or at least one of two or more parallel lines or a vernier scale structure.

11. The optical system according to claim 1, wherein at least one of the carrier substrate or at least one of the optical components comprises an adhesive layer adapted for at least one of a temporary or permanent fastening of at least one of the first or second optical component to the carrier substrate.

12. The optical system according to claim 11, wherein the adhesive layer is at least one of structured or not continuous, and wherein the first waveguide and second waveguide are oriented relative to each other under a partial deformation of the adhesive layer.

13. A carrier substrate comprising:
a markup set and adapted for depositing an optical component thereupon, comprising:
a waveguide; and
a markup set having at least one of a defined position or orientation with respect to the waveguide in such a manner the markup set is detectable based on at least one of a relative position or orientation of at least a second markup set when a desired orientation of the waveguide relative to the carrier substrate is achieved in a reference plane extending parallel to a surface of the carrier substrate.

14. A method for manufacturing an optical system, comprising:
providing at least one optical component, including at least one waveguide and a carrier substrate; and
arranging the at least one optical component on the carrier substrate;
wherein the at least one optical component comprises a respective markup set having at least one of a defined position or orientation with respect to at least one waveguide, and wherein the carrier substrate comprises a second markup set, and arranging the at least one optical component on the carrier substrate includes:
detecting at least one of a relative position or orientation of the markup set of the at least one optical component with respect to the second markup set of the carrier substrate for orienting the waveguide of the at least one optical component relative to the carrier substrate in a reference plane extending parallel to a surface of the carrier substrate.

15. The method for manufacturing an optical system according to claim 14, further comprising:
removing the carrier substrate from the at least one optical component after orienting the at least one optical component relative to the carrier substrate.

16. The method for manufacturing an optical system according to claim 15, wherein providing the at least one optical component comprises providing a first optical component and a second optical component and the method further comprises:
filling a gap between the first waveguide and the second waveguide with an optical filler material; and
filling a gap between the first optical component and the second optical component with a casting compound.

17. The method for manufacturing an optical system according to claim 16, further comprising:
back thinning of a surface of the first optical component and a surface of the second optical component into a shared rear side
depositing an electrical contact on a common front side of the first optical component and the second optical component;
attaching a sacrificial structure on a rear side of the first optical component facing away from the carrier substrate; and
attaching an auxiliary carrier with a recess for receiving the carrier substrate on a front side of the second optical component facing the carrier substrate.

* * * * *